(12) United States Patent
Fike

(10) Patent No.: US 6,426,482 B1
(45) Date of Patent: Jul. 30, 2002

(54) SEGMENTED MOLD FOR CURING TIRES

(76) Inventor: Louis T. Fike, 2905 Fragancia Ave., Hacienda Heights, CA (US) 91745

( * ) Notice: Subject to any disclaimer, the term of this patent is extended or adjusted under 35 U.S.C. 154(b) by 0 days.

(21) Appl. No.: 09/596,004

(22) Filed: Jun. 15, 2000

(51) Int. Cl.[7] .......................... B23K 26/38; B29C 33/00
(52) U.S. Cl. ..................... 219/121.72; 228/160; 425/54
(58) Field of Search ..................... 219/121.64, 121.72; 228/160; 425/28.1, 54, 55

(56) References Cited

U.S. PATENT DOCUMENTS

| 3,778,203 A | 12/1973 | MacMillan |
| 3,787,155 A | 1/1974 | Zangl |
| 3,806,288 A | 4/1974 | Materick |
| 4,013,390 A | 3/1977 | Moeller et al. |
| 4,022,554 A | 5/1977 | MacMillan |
| 4,025,250 A | 5/1977 | MacMillan |
| 4,181,482 A | 1/1980 | Grawey et al. |
| 4,289,463 A | 9/1981 | Le Moullac |
| 4,564,737 A * | 1/1986 | Burke et al. ........... 219/121.73 |
| 4,957,676 A | 9/1990 | Greenwood |
| 5,120,209 A | 6/1992 | MacMillan |
| 5,208,044 A | 5/1993 | Miyata et al. |
| 5,223,065 A | 6/1993 | Kogure |
| 5,234,326 A | 8/1993 | Galli et al. |
| 5,247,151 A * | 9/1993 | Hagerman ................. 425/28.1 |
| 5,676,980 A | 10/1997 | Gulka et al. |

* cited by examiner

Primary Examiner—Samuel M. Heinrich
(74) Attorney, Agent, or Firm—Fulwider Patton Lee & Utecht, LLP

(57) ABSTRACT

A method of making a segmented mold utilizing a first number of matrix sections employed with a second number of inserts which cannot be equally divided by the number of matrix segments.

7 Claims, 11 Drawing Sheets

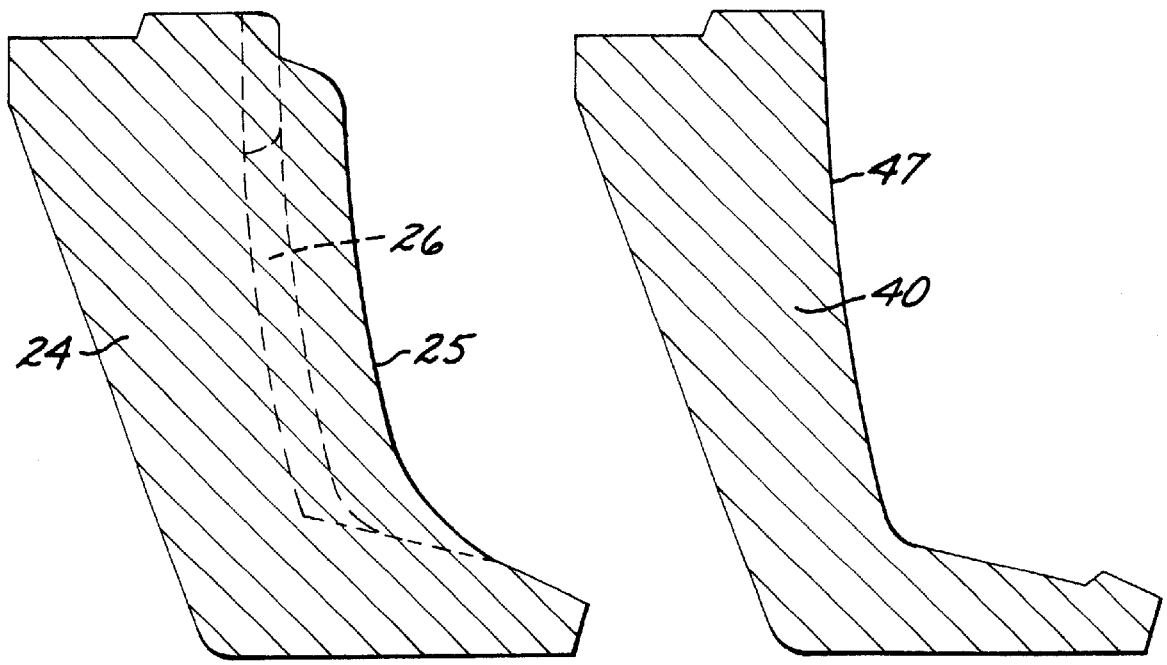
FIG. 4 PRIOR ART
FIG. 5
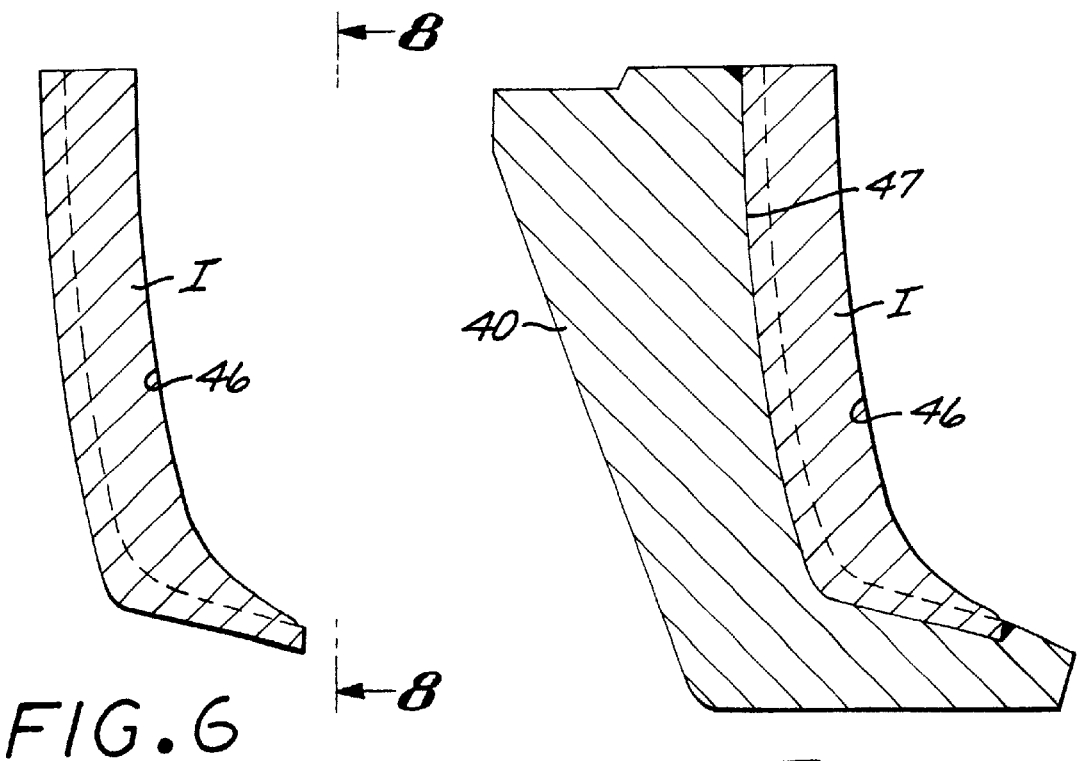
FIG. 6
FIG. 7

SEGMENTED MOLD FOR CURING TIRES

FIELD OF THE INVENTION

The present invention relates generally to molds for curing pneumatic tires and more particularly to a method of making a segmented mold for curing tires.

BACKGROUND OF THE INVENTION

It is well known to cure a tire in a mold having a plurality of matrix segments arranged within a mold shell. The matrices are supported on guide pins carried by the upper and lower mold shell halves, with the guide pins being disposed at an angle to the general axis of the matrix assembly. The matrix segments are spring loaded to move axially relative to the mold shell halves whereby when the matrix assembly is opened, the matrix segments are automatically moved axially and circumferentially to open positions for the reception or release of a tire. Such a construction is disclosed in several U.S. patents including MacMillan U.S Pat. No. 3,778,203 and Gulka U.S. Pat. No. 5,676,980. In such segmented molds, the upper and lower matrix segment assemblies define the configuration of the tire. The configuration of the tire being cured includes an outer peripheral portion wherein there is defined a tread pattern. Generally, in the case of known segmented molds a plurality of matrix segments are arranged circumferentially to define the configuration of the tire to be cured with the grooves in tire tread pattern being generated by ribbing formed in the matrix segments as such segments are cast. The tread design is generally defined by a number of pitches which can be equally divided into the number of matrix segments. If, however, a tire tread design calls for a number of pitches which cannot be divided equally into the number of matrix segments, it is necessary to provide complex casting patterns for the ribbing to accommodate the bridging of pitches at the juncture of adjoining matrix segments. The cost of casting such ribbing is much higher than the cost of casting conventional matrix segments utilizing a number of pitches which can be equally divided into the number of matrix segments.

MacMillan U.S. Pat. No. 5,120,209 discloses a tire curing mold employing a plurality of inserts equal in length to an individual pitch which are secured to a plurality of matrix segments. Each insert is formed with ribbing defining an increment of the complete tire tread pattern and the adjoining inserts match one another in defining such complete tire tread pattern. The individual inserts of MacMillan U.S. Pat. No. 5,120,209 are divided equally into the number of matrix segments. For example, with twelve matrix segments, six individual inserts are utilized with each matrix segment. A problem arises, however, where an odd number of inserts are necessitated by the configuration of a particular tread design, for example, where twenty-nine individual inserts are carried by eight matrix segments to define the tire tread pattern. Clearly, twenty-nine can not be equally divided by eight.

SUMMARY OF THE INVENTION

The present invention is directed to a method of making a segmented mold for curing tires utilizing a plurality of pitch-defining inserts that collectively generate a tread pattern wherein the number of individual inserts cannot be evenly divided by the number of matrix segments, e.g. where twenty-nine individual inserts are utilized with eight matrix segments.

In carrying out the method of the present invention, a first number of matrix sections are employed with respect to a second number of pitch defining inserts which cannot be equally divided by the number of matrix sections to collectively form a desired tire tread pattern. By way of example, twenty-nine inserts are supported by eight matrix segments. With this example, certain of the inserts will necessarily be disposed at the junctures of the matrix segments. The method of the present invention includes the steps of securing inserts to the entire periphery of joined-together matrix sections, except where an insert is to be positioned at the juncture of two adjoining matrix segments, to thereby form an empty space that extends over the side edges of each such juncture. The matrix sections are then separated along such juncture. A complete insert is secured to adjoining matrix sections within the empty spaces. Next, the portions of the inserts that overhang the side edges of the matrix sections are trimmed to conform to the surfaces of such side edges. The incremental portions of the inserts collectively generate the complete tire tread pattern, since the grooving formed by the ribbing of each insert matches the grooving of the adjoining insert. The matrix segments are then arranged in the mold shell with the adjoining inserts collectively defining the complete tread pattern of a tire to be cured. The upper and lower mold shell halves are closed with uncured rubber disposed therebetween. The rubber is cured so as to cure and define the tire. Finally, the mold shell is opened and the cured tire removed from the matrix assembly.

The method of the present invention provides a segmented mold having a number of pitch-defining inserts which cannot be equally divided by a number of matrix segments to be constructed in an efficient, cost-saving manner. Such mold also produces a clearly defined tire tread pattern that can be replicated over a long service life of the mold.

Further advantages afforded by the method of the present invention will become apparent from the following detailed description, when taken in conjunction with the accompanying drawings.

BRIEF DESCRIPTION OF THE DRAWINGS

FIG. 4 is a vertical sectional view of a prior art matrix segment.

FIG. 5 is a vertical sectional view taken in enlarged scale similar to FIG. 4 showing a matrix segment embodying the present invention before it has had affixed thereto a pitch-defining insert shown in FIG. 6.

FIG. 6 is a vertical sectional view of an insert received by the matrix segment of FIG. 6

FIG. 7 is a vertical sectional view similar to FIGS. 5 and 6, showing the insert affixed to the matrix segment.

DETAILED DESCRIPTION OF A PREFERRED EMBODIMENT

Figure 1:
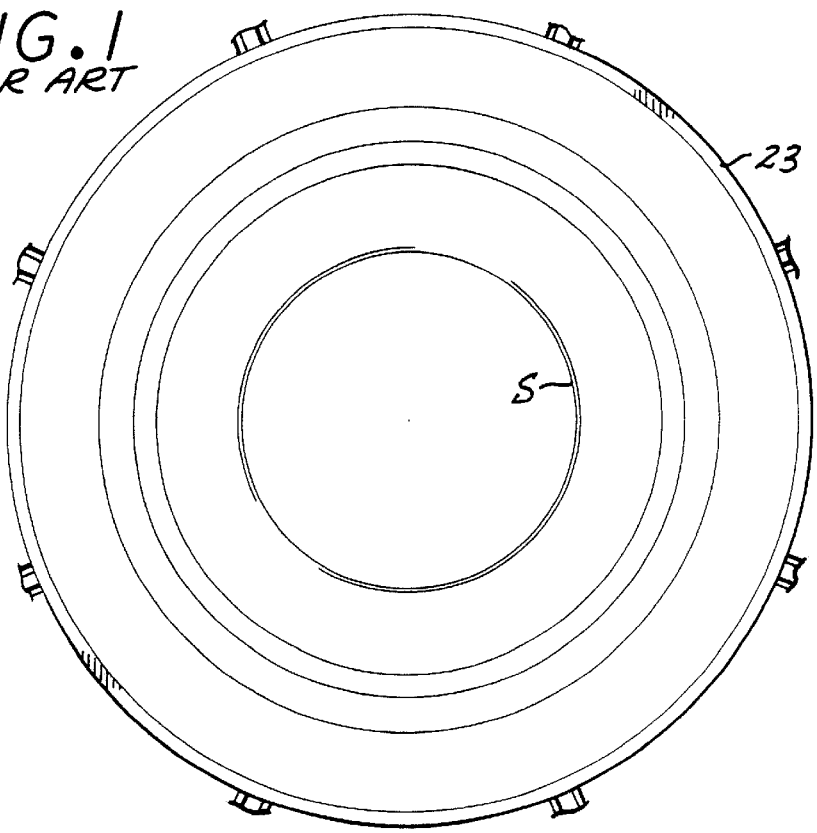
FIG. 1 is a top plan view of an empty lower mold shell utilized with a conventional prior art segmented mold in curing tires.
Figure 2:
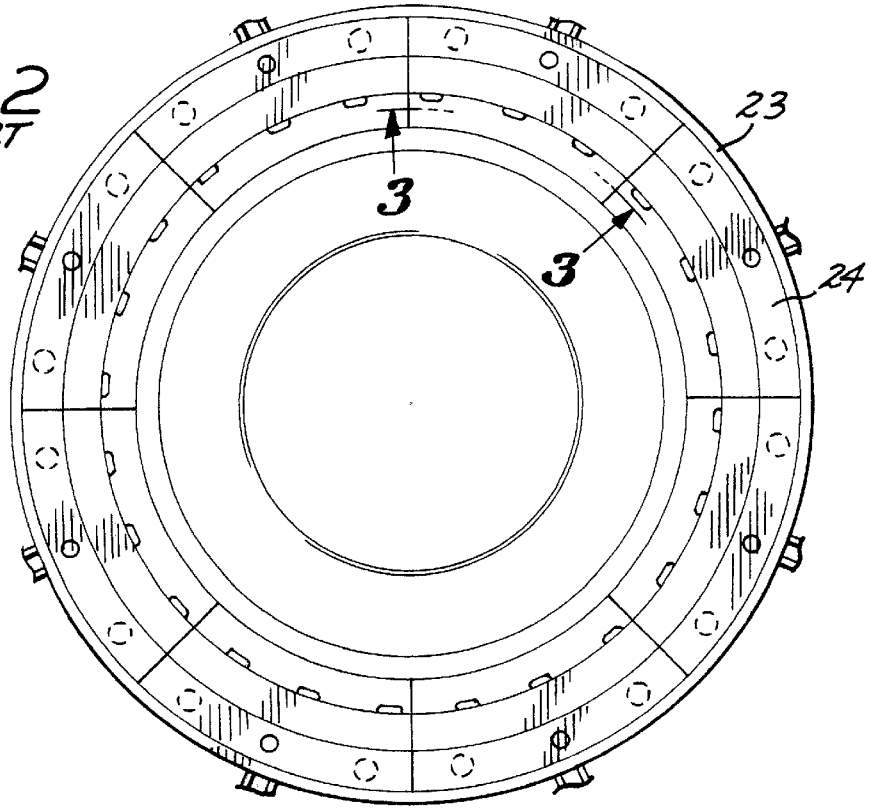
FIG. 2 is a top plan view of the mold shell of FIG. 1 after the matrix segments have been secured therewithin in accordance with the prior art.
Figure 3:
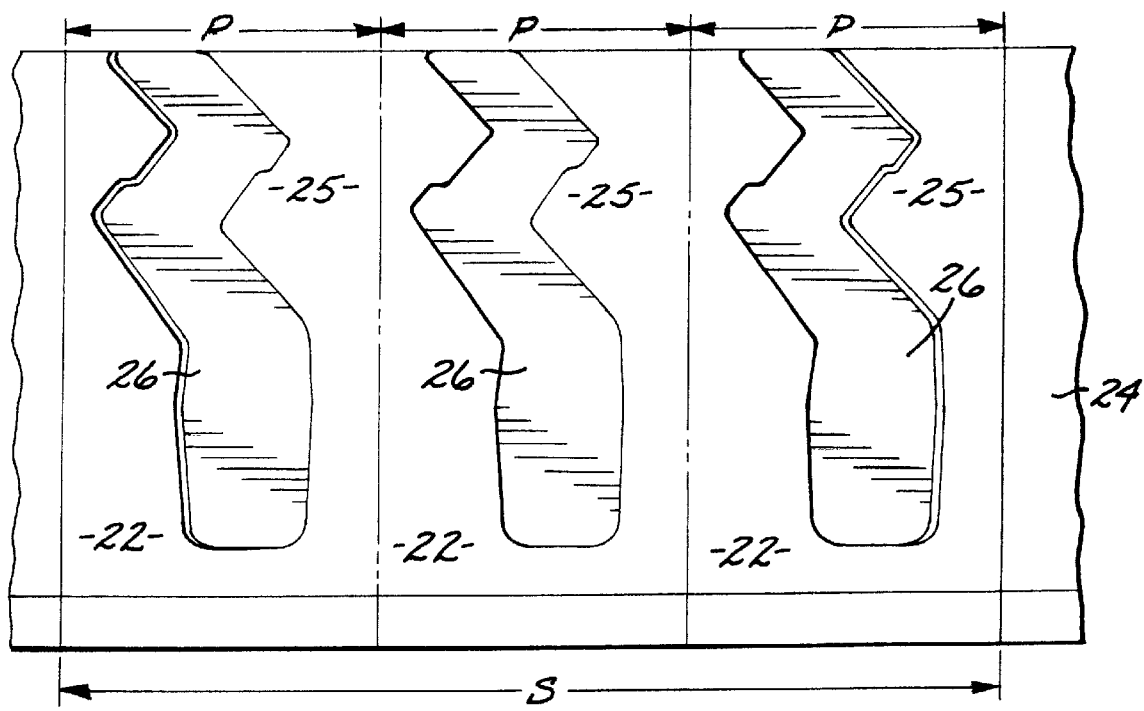
FIG. 3 is a vertical sectional view taken in enlarged scale along lines 3—3 of FIG. 2 showing a portion of a matrix segment formed with ribbing defining repetitive individual tread pattern pitches.

Referring to the drawings FIGS. 1–4 disclose a known prior art segmented mold employed in carrying out a conventional tire molding method. FIG. 1 is a top plan view of the bottom half of a shell 23 of a conventional segmented mold S. In FIG. 2, the mold shell 23 has received a plurality of eight, like matrix segments each designated 24 and each of which have been formed with three repetitive individual pitches 25 which collectively define the complete tread pattern of a tire to be molded. As shown in FIG. 3 the pitches include ribbing 26 that defines the grooving 27 of the tire tread pattern. The total number of pitches is twenty-four which can be equally divided by the number of matrix segments, namely eight matrix segments. A vertical cross-sectional view of an individual matrix segment 24 formed with ribbing 26 is shown in FIG. 4.

Figure 20:
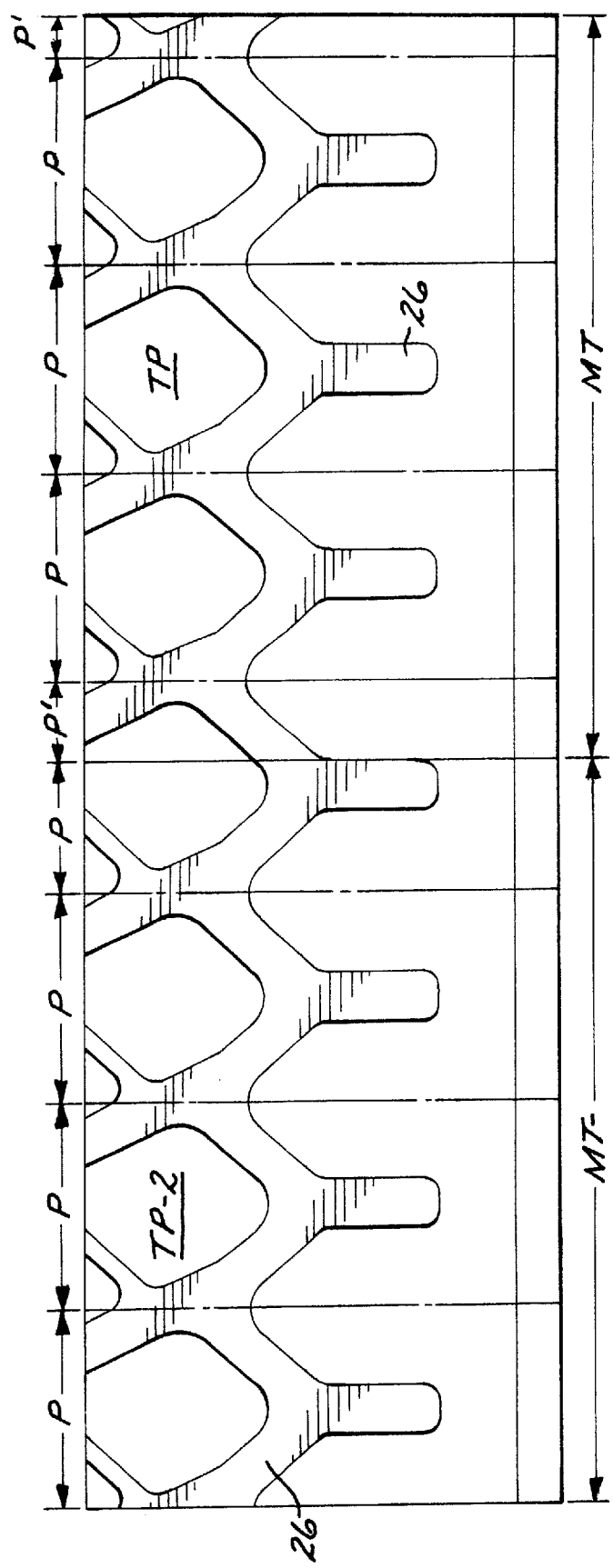
FIG. 20 is a top plan view of a pair of adjoining matrix segments.
Figure 21:
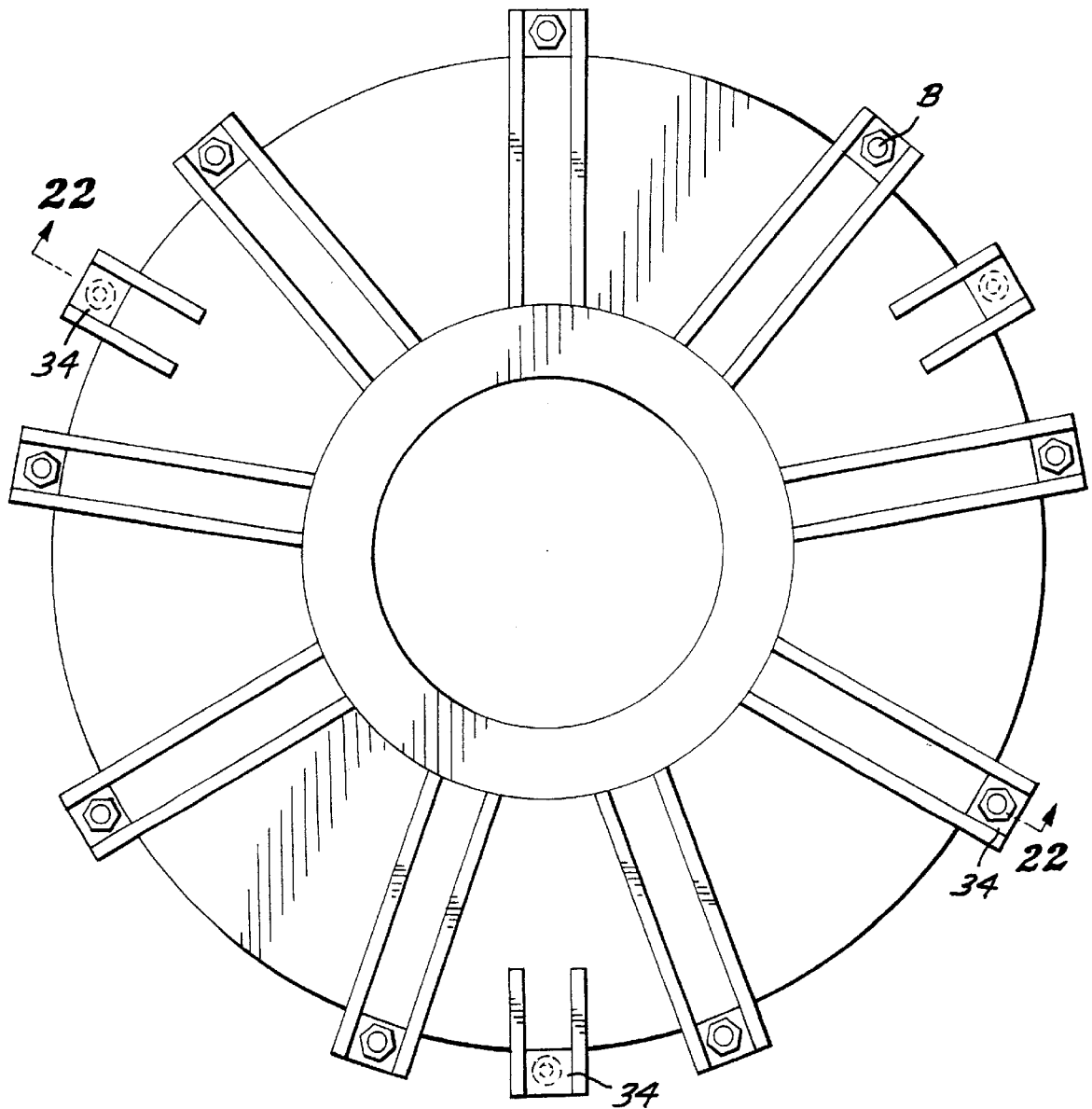
FIG. 21 is a top plan view of a mold containing a segmented mold made in accordance with the present invention.
Figure 22:
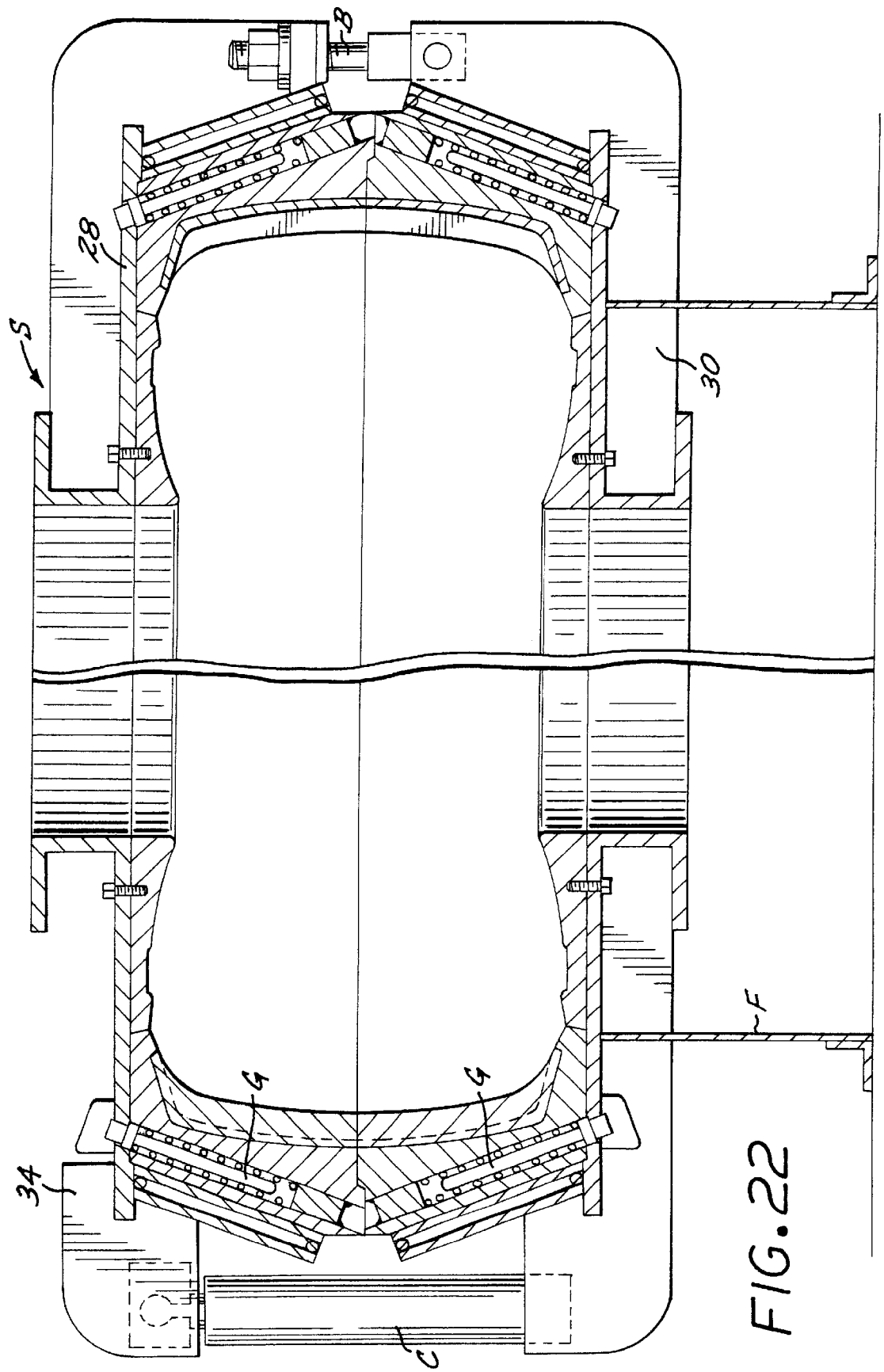
FIG. 22 is a vertical sectional view taken in enlarged scale along line 22—22 of FIG. 21.

Segmented mold components utilized in the preferred method of the present invention are shown in FIGS. 5–22 of the appended drawings. Referring first to FIGS. 21 and 22, there is shown a conventional segmented mold S similar to that shown in FIGS. 1 and 2. The mold includes a cover 28 and a base 30. The base 30 is affixed to a mold frame F. Cover 28 is movable upwardly and downwardly relative to the base 30 under the influence of fluid operated cylinder and piston units C. The lower end of each cylinder and piston unit C is affixed to the outer peripheral portion of base 30, while the plungers 32 of such units are removably secured to a clamp arm 34 that engages the upper outer peripheral portion of the covers. A plurality of like, clamping bolt and nut units B releasably retain the cover shell against vertical movement away from the base 30 during a tire curing operation. A plurality of inclined conventional guide pins and spring units G constantly bias the upper and lower matrix segments outwardly away from the center-line of the mold shell to assist in freeing a cured tire from the matrix assembly.

Figure 8:
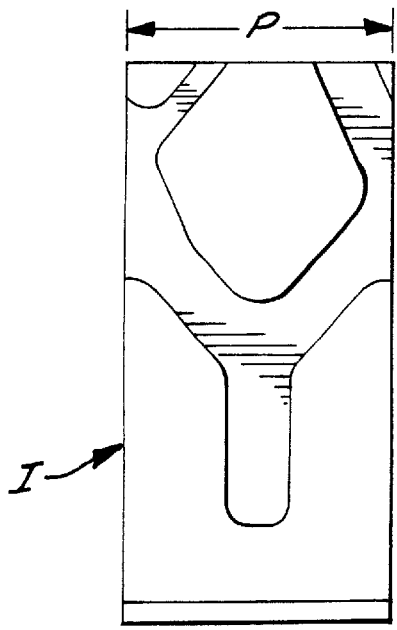
FIG. 8 is a top plan view of an individual insert.

Referring to FIGS. 5, 6, 7 and 8, the mold S receives complementary arrays of like matrix segments in a conventional manner. Each matrix segment 40 receives a plurality of like inserts I welded to the concave surface 47 of the segment 40. The inserts are formed with ribbing 46 whereby the inserts collectively define a desired tire tread pattern. Referring to FIG. 8, each insert I is the length of an individual pitch P of the desired tire tread pattern.

Figure 9:
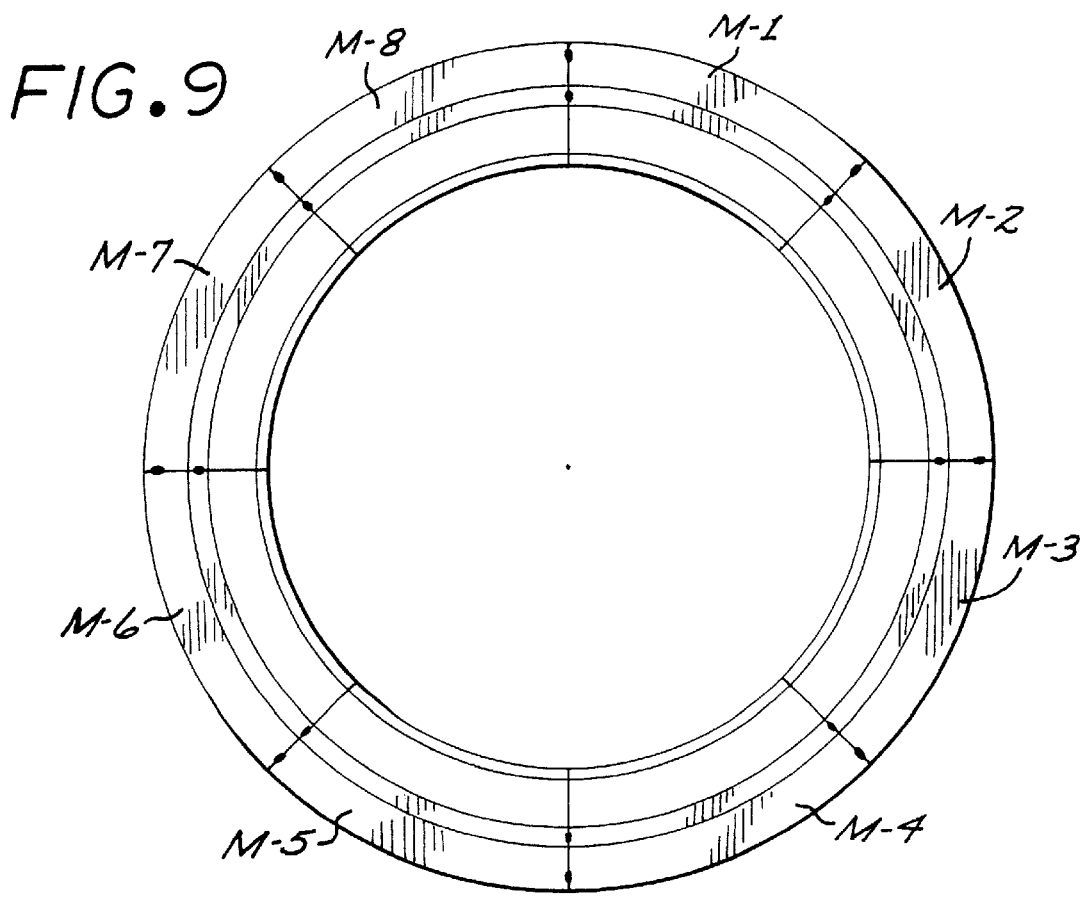
FIG. 9 is a top plan view of a plurality of matrix segments which have been temporarily plug welded together.
Figure 10:
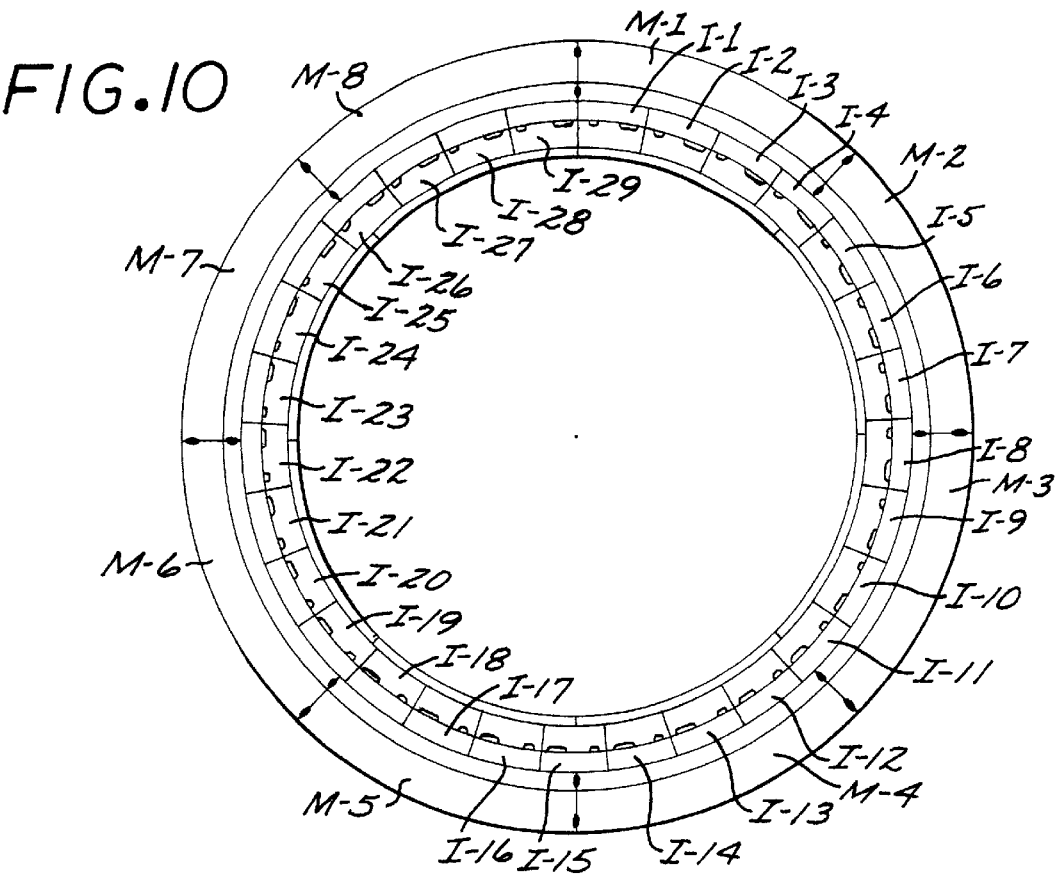
FIG. 10 is a top plan view showing inserts positioned on the matrix.
Figure 11:
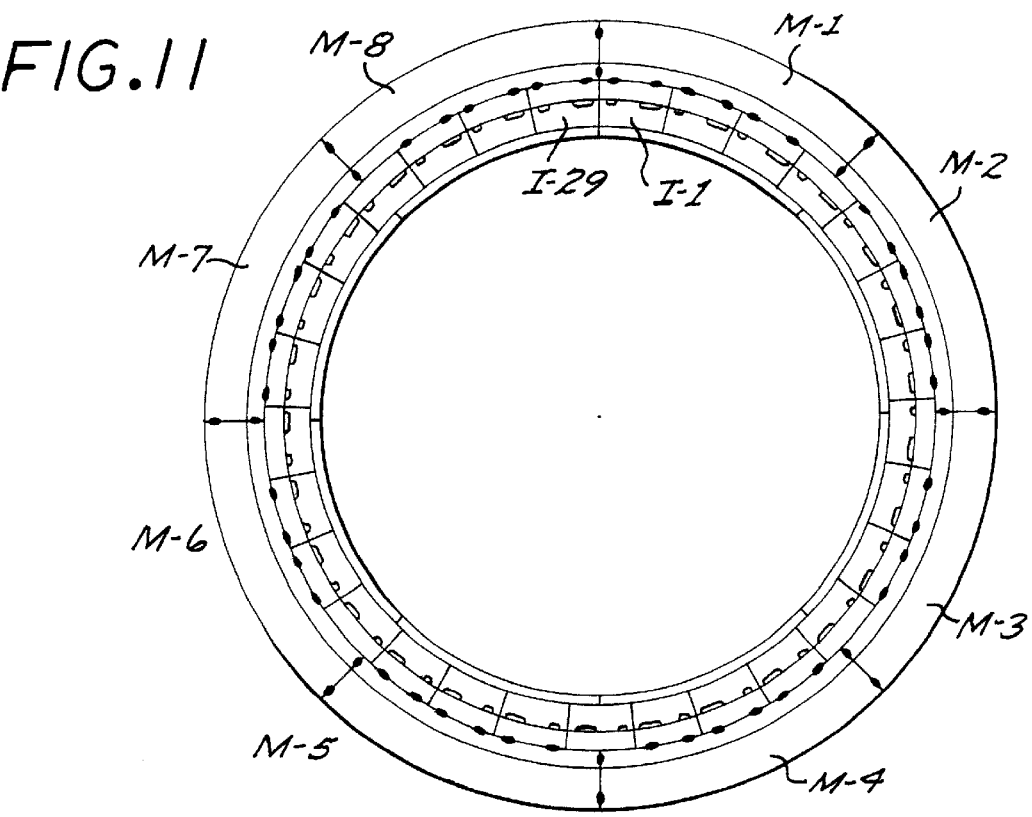
FIG. 11 is a top plan view of a the matrix segment assembly of FIG. 9 to which a plurality of the inserts have been plug welded.
Figure 12:
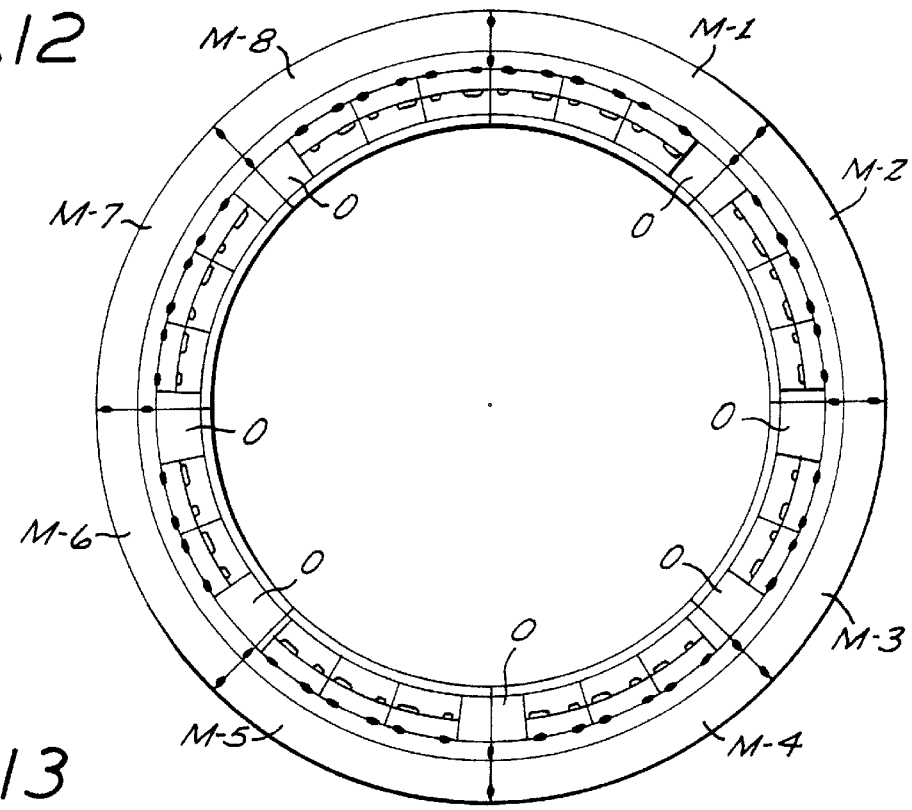
FIG. 12 is a top plan view showing how the inserts are removed from the matrix segments at the juncture of such matrix segments.
Figure 13:
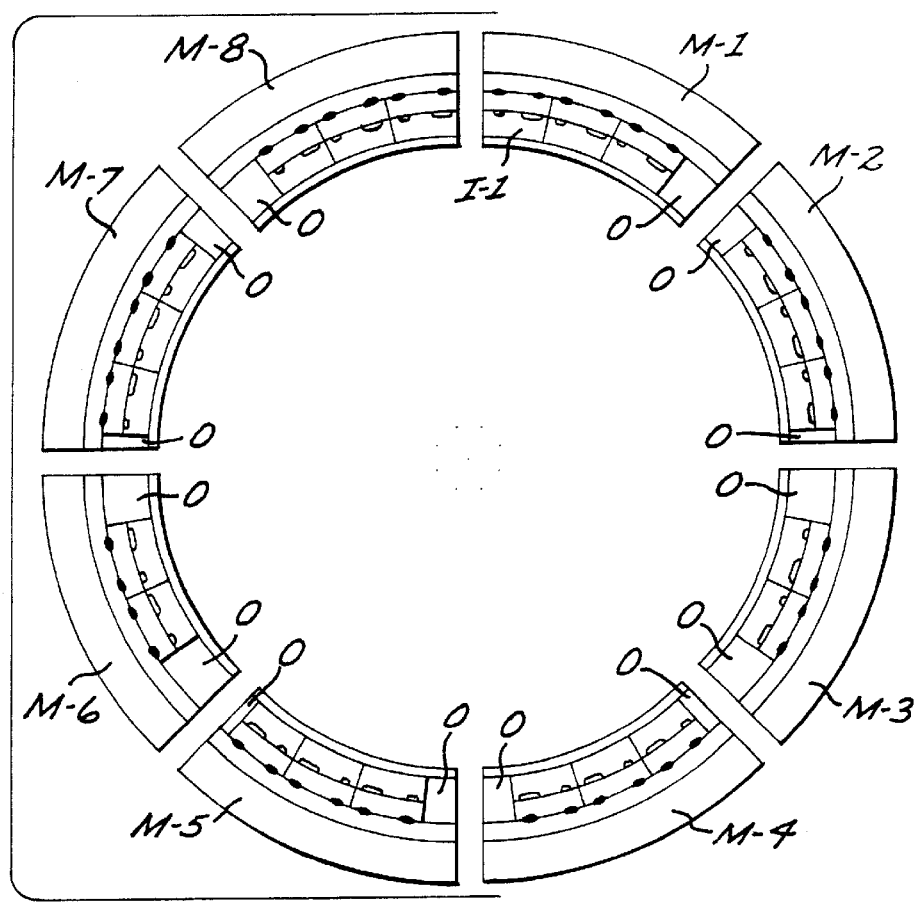
FIG. 13 is a top plan view showing the matrix segments after they have been separated.
Figure 14:
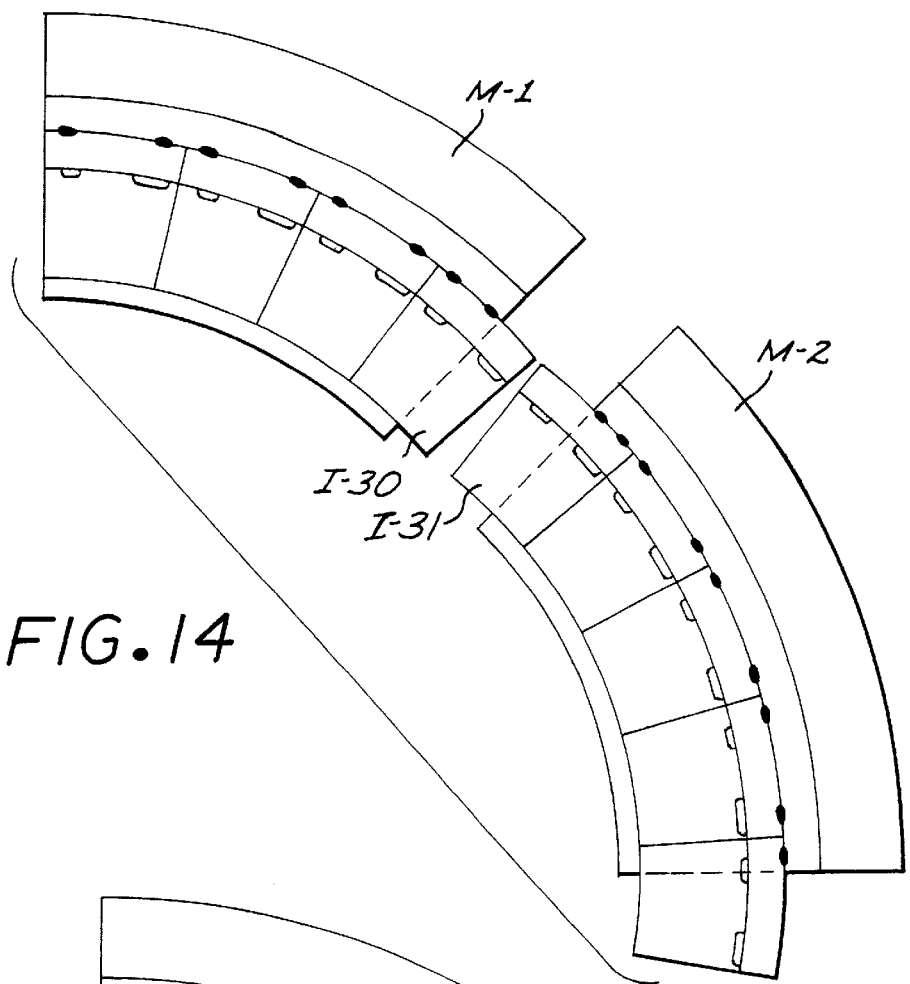
FIG. 14 is a fragmentary view in enlarged scale showing two complete inserts spot welded to adjoining matrix segments.
Figure 15:
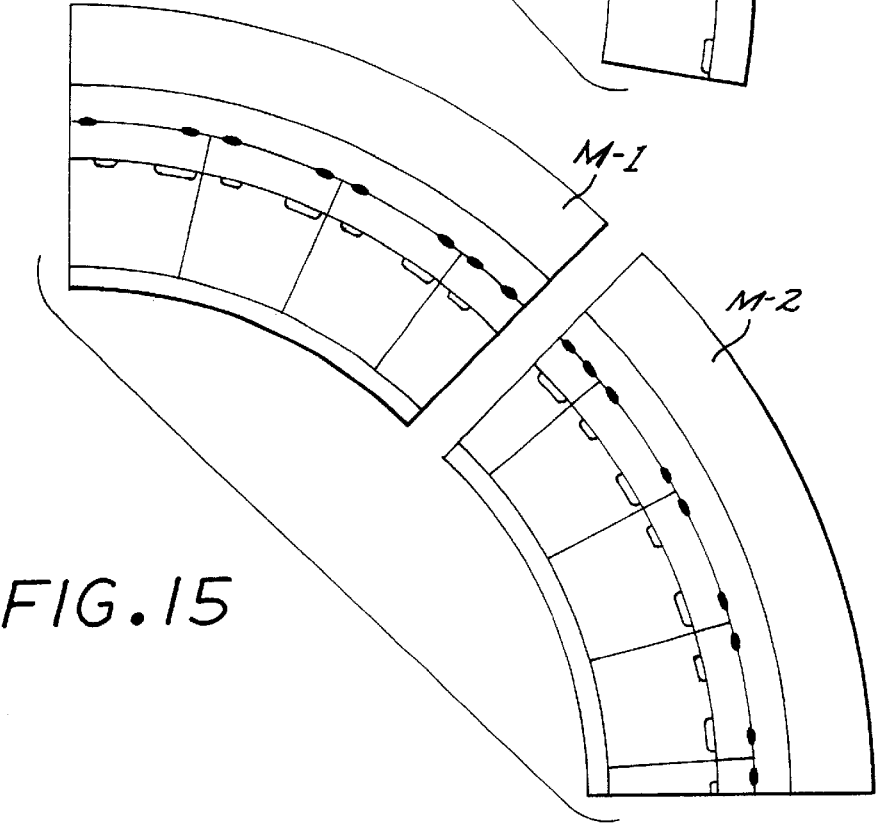
FIG. 15 is a view showing the overhanging portions of the complete inserts of FIG. 14 trimmed off the side edges of their respective adjoining matrix segments.

More particularly, referring to FIG. 9, eight matrix segments M-1 through M-8 are shown spot welded together in a circular array. In FIG. 10 the twenty-nine inserts I-1 through I-29 are shown positioned around the circumference of the joined-together matrix segments. In FIG. 11 all of the inserts are shown spot welded to their respective matrix segments, with the exception of inserts I-4, I-8, I-11, I-15, I-19, I-22 and I-26. Such inserts bridge the Juncture between adjoining matrix segments. Referring now to FIG. 12, the aforementioned inserts I-4, etc. are removed from their respective matrix segments so as to define empty spaces O at the juncture of adjoining matrix segments. In FIG. 13 the matrix segments are shown after they have been separated from one another. Referring now to FIG. 14, a pair of complete inserts I-30 and I-31 are shown spot welded to adjoining matrix segments M-1 and M-2 so as to fill the aforedescribed spaces O therebetween. Similarly, a complete insert I-32 is shown spot welded to the end of matrix segment M-2 remote from matrix segment. In FIG. 15 the overhanging portions of adjoining inserts I-30, I-31 and I-32 have been cut off even with the sides of adjoining matrix segments M-1 and M-2, with insert I-32 being trimmed off even with the side edge of matrix segment M-2 remote from matrix section M-1.

Figure 16:
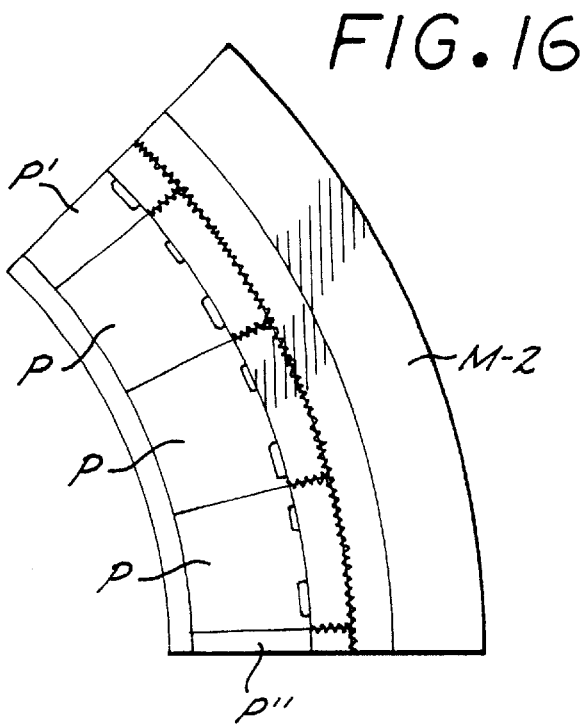
FIG. 16 shows the inserts welded to a matrix segment.
Figures 17, 18, 19:
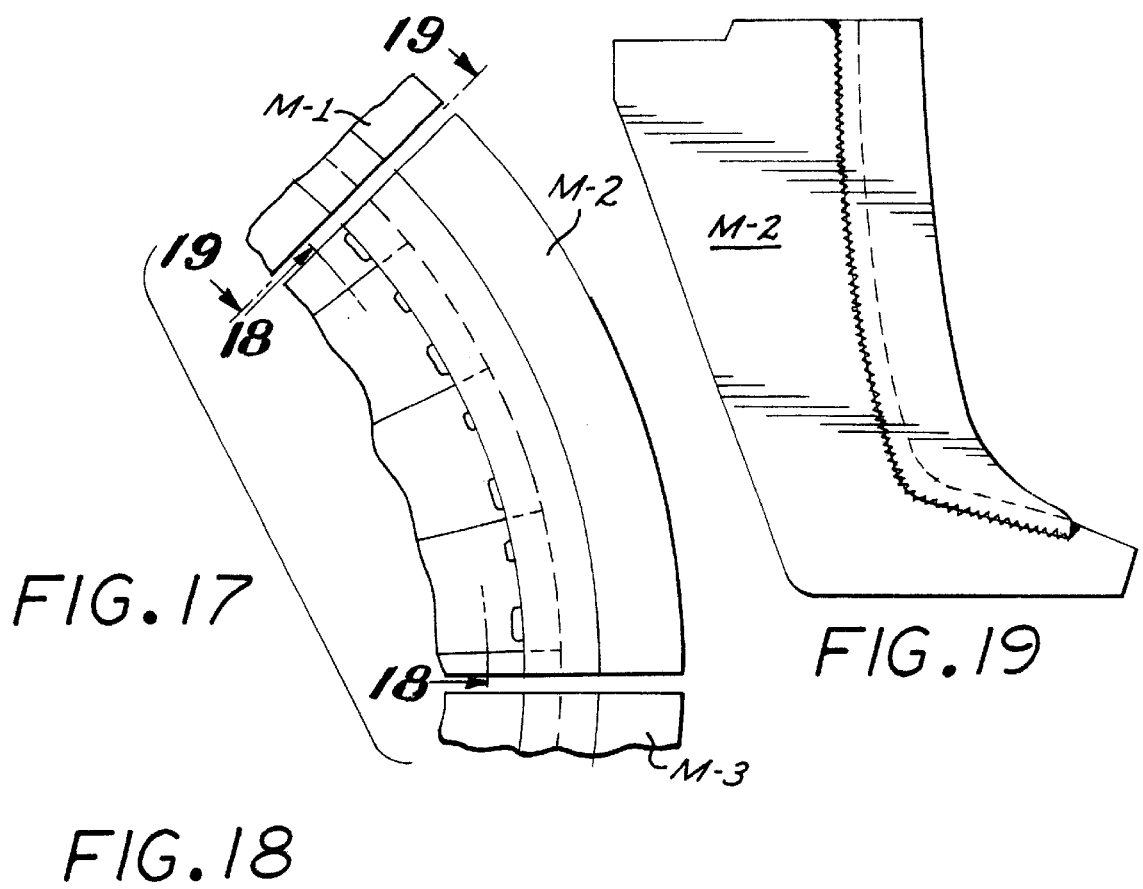
FIG. 17 and 18 show a plurality of inserts as welded onto a matrix segment.
FIG. 19 is a vertical sectional view taken in enlarged scale along line 19—19 of FIG. 18.

Inserts I-1 and I-29 do not overlap the side edges of their respective matrix sections, and inserted their adjoining edges about one another. In FIGS. 16 and 17, the side edges of inserts I-30 and I-31 have been ground off even with the side edges of matrix segment M-1 and final welded to such matrix segment. All of the other inserts and segments will be finished off in the same manner.

FIG. 18 is a top plan view of a typical matrix segment MT which supports three complete P inserts and first and second insert portions P' and P" that remain on the matrix segment after the overhanging portions of the complete inserts P have been trimmed off even with the side edges of the matrix segment. In FIG. 20 two typical matrix segments, MT and MT-1 are shown with their adjoining side edges in abutment. It will be noted that the tread pattern grooving TP-2 formed by the ribbing 46 of insert I-27 is contiguous with the tread pattern grooving TP-2 abutting matrix segment TP-2. It should be understood that in FIGS. 18 and 19 the actual curvature of the matrix segments and inserts are not shown in the interest of clarity.

It is an important part of the present invention that by trimming off the overhanging portions of the inserts even with the side edges of the matrix segments, the angles of the inserts will exactly match the angles of the respective matrix segments. If such matching is not effected the matrix assemblies will not close properly during a tire curing operation thereby resulting a flawed tire. It is possible to effect such matching because the adjoining side edges of the matrix segments firmly guide the cutting device (such as a laser cutter) as the overhanging portion of the inserts are trimmed. It is also essential that the grooving defined by the insert ribbing match perfectly in order to effect a continuity of flow of uncured rubber between the grooves of adjoining inserts so as to consistently form a clearly defined tire tread pattern each time a tire is cured over the service life of the tire mold.

Various modifications and changes may be made with respect to the foregoing detailed description without departing from the scope of the present invention. For example, inserts having different widths rather than the same width may be utilized to form a desired tire tread pattern. Also, the number of inserts and matrix segments may be varied from those described hereinbefore.

What is claimed is:

1. A method of making a segmented mold to cure a tire formed with a continuous tread pattern, said method comprising:

providing a first number of matrix segments;

providing a second larger number of inserts which cannot be divided equally into the first number, each insert being formed with ribbing whereby the inserts collectively form said continuous tread pattern;

temporarily joining the matrix segments together in a circular array;

positioning a plurality of inserts in abutting relationship around the periphery of the joined together matrix segments;

removing any inserts which bridge the juncture of the abutting matrix segments to define empty spaces at such junctures;

separating the matrix segments;

attaching an insert to the adjoining edge portions of the matrix sections to fill said spaces, with each such insert overlapping the side edges of its respective matrix segment;

and cutting off the overhanging portion of the inserts even with the side edges of their respective matrix segments, with the ends of the incremental portion of the tread pattern of the inserts disposed in matching relationship whereby such incremental portions collectively define the continuous tread pattern.

2. A method as set forth in claim 1, wherein the overhanging portions of the inserts are ground flush with the side edges of their respective matrix segments after such inserts have been cut off such matrix segments.

3. A method as set forth in claim 1, wherein the matrix segments are temporarily secured together by plug welding.

4. A method as set forth in claim 1, wherein the overhanging portions of the inserts are cut off by a laser cutter.

5. A method as set forth in claim 2 wherein the matrix segments are temporarily secured together by plug welding.

6. A method as set forth in claim 2, wherein the overhanging portions of the inserts are cut off by a laser cutter.

7. A method as set forth in claim 2, wherein the matrix segments are temporarily secured together by plug welding and wherein the overhanging portions of the inserts are cut off by a laser cutter.

* * * * *